No. 851,191. PATENTED APR. 23, 1907.
M. J. WOLFE.
BURNER ATTACHMENT.
APPLICATION FILED APR. 3, 1906.

Witnesses
O. E. Murray.
M. A. Schmidt

Inventor
Melissa J. Wolfe.
By
Milo B. Stevens and Co.
Attorneys.

UNITED STATES PATENT OFFICE.

MELISSA JANE WOLFE, OF LOS ANGELES, CALIFORNIA.

BURNER ATTACHMENT.

No. 851,191.      Specification of Letters Patent.      Patented April 23, 1907.

Application filed April 3, 1906. Serial No. 309,591.

*To all whom it may concern:*

Be it known that I, MELISSA JANE WOLFE, a citizen of the United States, residing at Los Angeles, in the county of Los Angeles and State of California, have invented new and useful Improvements in Burner Attachments, of which the following is a specification.

This invention is an attachment for the burner of a vapor or gas stove, having for its object to utilize and economize to a greater extent the heat from the flame, as well as a better and more even distribution thereof.

Figure 1:
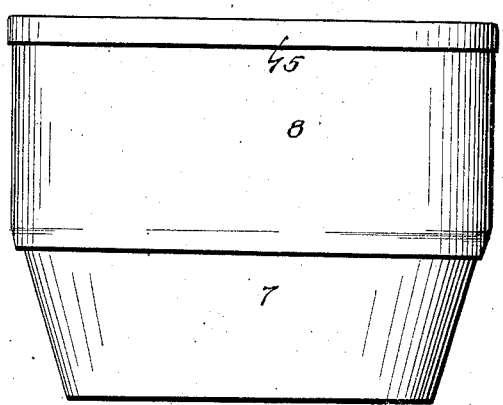
Figure 2:
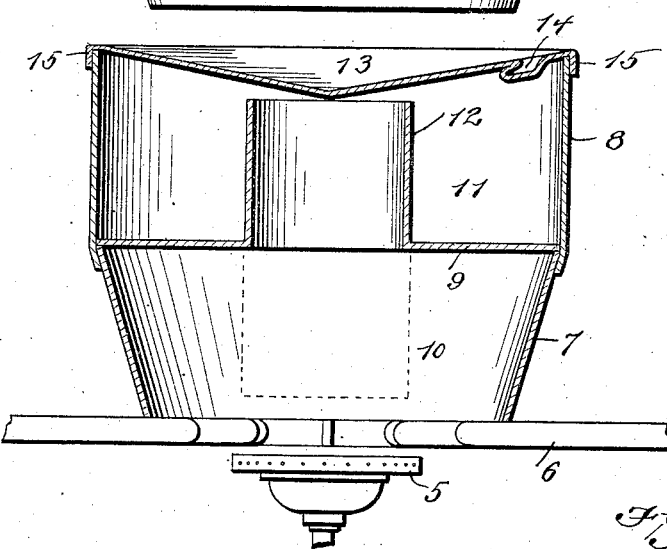
Figure 3:
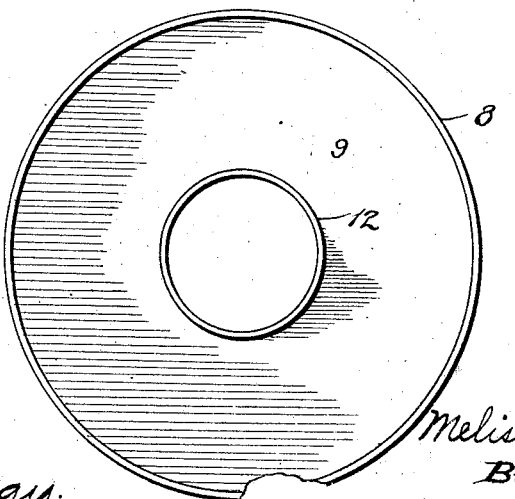

In the accompanying drawing: Figure 1 is an elevation of the attachment; Fig. 2 is a central vertical section showing the application thereof, and Fig. 3 is a plan view with the cover removed.

Referring specifically to the drawing, 5 denotes the burner of an ordinary vapor or gas stove, and 6 the spider above said burner for supporting a cooking vessel when the attachment is not in use.

The attachment comprises a cylinder consisting of a base portion 7, and a top portion 8. The base portion is made upwardly flaring as shown, and on top thereof is loosely supported a circular plate 9 which forms a horizontal partition dividing the cylinder into two chambers 10 and 11, respectively, the top portion 8 of the cylinder being secured at its lower end to the base portion so as to inclose the plate 9. A central flue 12 extends from one side of the plate, said flue being open at both ends so that the chambers 10 and 11 are placed in communication with each other through said flue.

A lid or cover for closing the chamber 11 is indicated at 13. The lid is made conical, the apex being downwardly presented into the chamber 11 so that the heat will be deflected and evenly distributed under the lid. A socket 14 is made in the lid for a lifter. At the edge of the lid is a flange 15 which fits over the top edge of the cylinder whereby, a tight closure is had and escape of heat from the chamber 11 prevented.

In use, the attachment is placed on the spider 6 with the chamber 10 directly over the burner 5 as shown in Fig. 2. The heat passes into said chamber and through the flue 12 into the chamber 11. The latter chamber can be used for cooking or baking various articles of food, which are placed on the plate 9. If desired a circular pan with a central opening can be placed on said plate. A cooking vessel can also be placed on the lid 13 which, by reason of its conical shape, prevents the heat from coming in direct contact with the bottom of such vessel, thereby preventing burning or scorching of the food.

From the above description it will be apparent that by the use of the attachment different articles of food can be cooked at the same time, and the heat from the flame will be utilized to the greatest extent. The flaring base portion 7 of the cylinder protects the flame from drafts and prevents a waste of heat and blowing out of the flame. Besides cooking various articles of food, the chamber 11 can be also used for heating flat irons by reversing the plate 9 so that the flue 12 depends into the chamber 10, as shown by dotted lines in Fig. 2, the irons being placed on said plate. The attachment can be readily applied to any ordinary gas or vapor stove, and no special stove construction is required.

I claim:

A device of the kind stated comprising a cylinder, a horizontal partition therein forming upper and lower chambers in the cylinder, and having an opening, and a flue on one side of the partition and communicating with the opening therein, said partition being reversible to permit the flue to be extended into either of the aforesaid chambers.

In testimony whereof I have signed my name to this specification in the presence of two subscribing witnesses.

MELISSA JANE WOLFE.

Witnesses:
     F. M. TOWNSEND,
     ANNA MORGAN.